(12) United States Patent
Schwarz et al.

(10) Patent No.: US 6,416,122 B1
(45) Date of Patent: Jul. 9, 2002

(54) MOTOR VEHICLE ROOF WITH AT LEAST TWO COVERS LOCATED IN A COMMON ROOF OPENING

(75) Inventors: Markus Schwarz, Titisee-Neustadt; Burkhard Reinsch, Kaufbeuren; Otto Wienchol, Hohenschäftlarn, all of (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/666,471

(22) Filed: Sep. 20, 2000

(30) Foreign Application Priority Data

Sep. 20, 1999 (DE) .......................................... 199 53 104

(51) Int. Cl.[7] .................................................. B60J 7/047
(52) U.S. Cl. ................................... 296/220.01; 296/223
(58) Field of Search ........................... 296/220.01, 222, 296/223

(56) References Cited

FOREIGN PATENT DOCUMENTS

| GB | 437589 | 10/1935 | | |
|----|--------|---------|---|---|
| GB | 573355 | * 11/1945 | ............ | 296/220.01 |
| JP | 357164812 | * 10/1982 | ............ | 296/220.01 |
| JP | 78828 | * 5/1983 | ................ | 296/222 |
| WO | WO 96/26081 | 8/1996 | | |

* cited by examiner

*Primary Examiner*—Dennis H. Pedder
(74) *Attorney, Agent, or Firm*—Nixon Peabody LLP; David S. Safran

(57) ABSTRACT

Motor vehicle roof with a roof opening (2) in a fixed roof skin (1) and at least two covers (3, 4) which flush in the roof opening one behind the other in a closed position which closes the roof opening (2), and which can be pushed into an open position in which one at least partially overlaps another to partially expose the roof opening (2), the cover (4) which is the rear cover in the direction of forward vehicle travel resting at least partially under the front cover (3). The covers are individually selectively actuated for displacement by a single mechanism which causes one of the two adjacent covers (3, 4) to be displaced while the other cover (4 and 3) remains stationary.

16 Claims, 8 Drawing Sheets

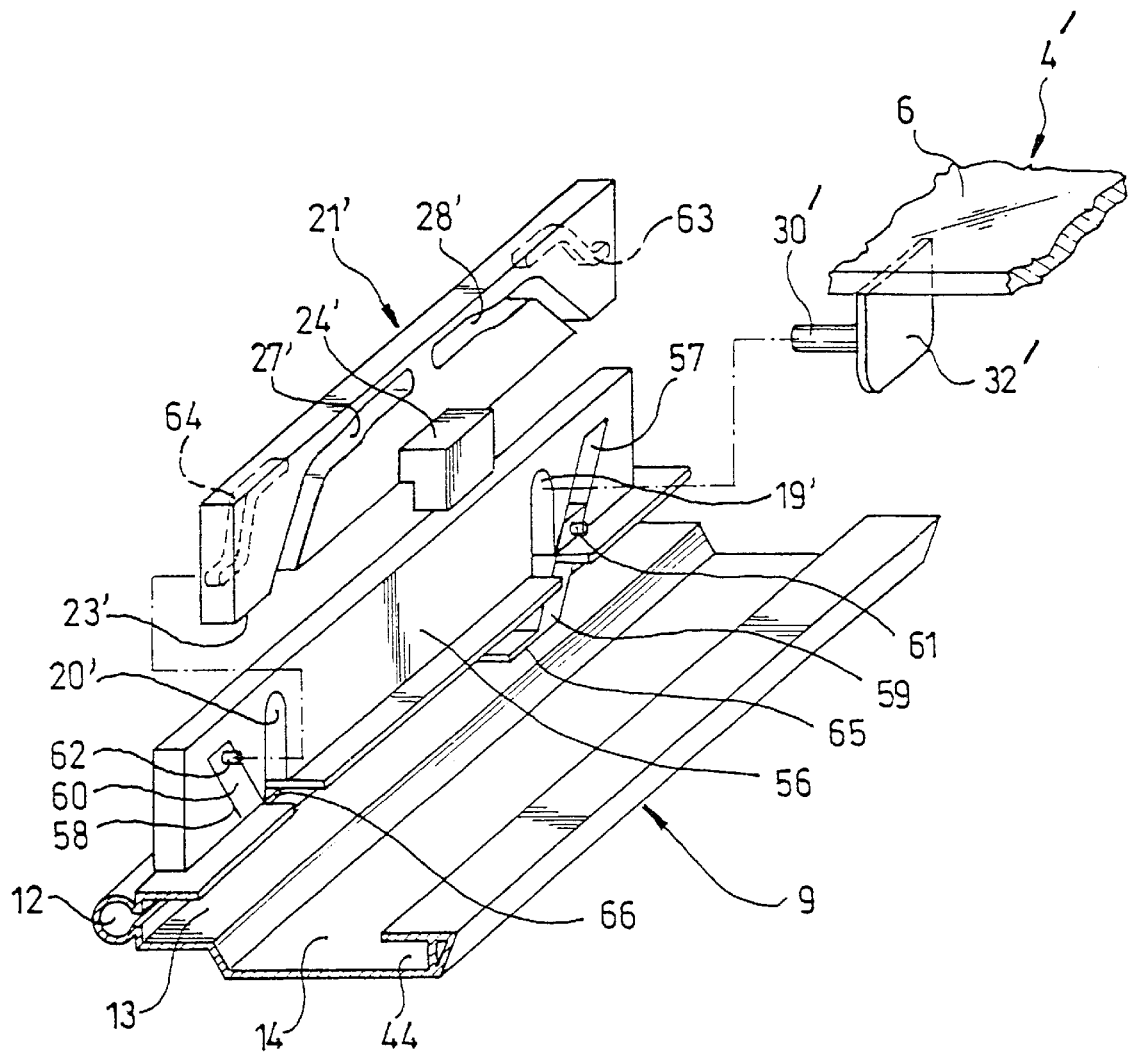
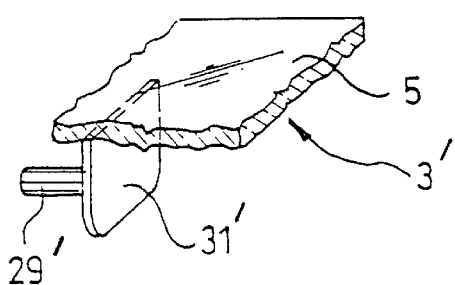
FIG. 4

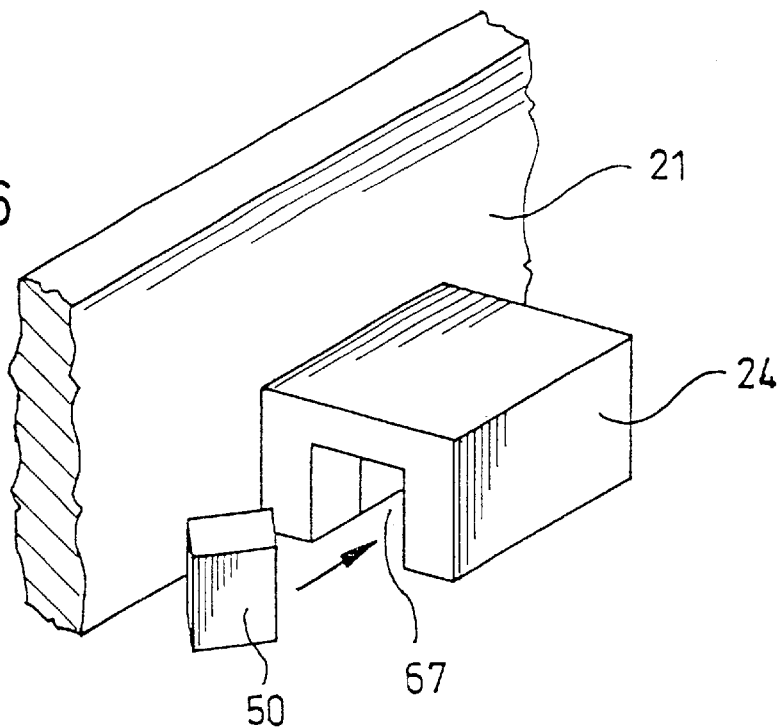
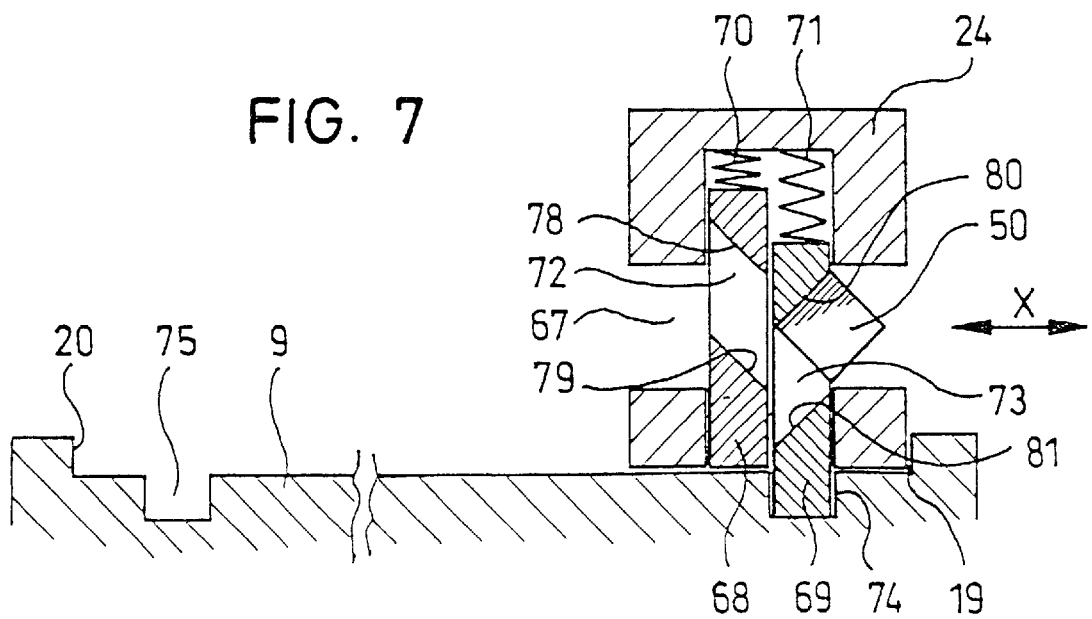

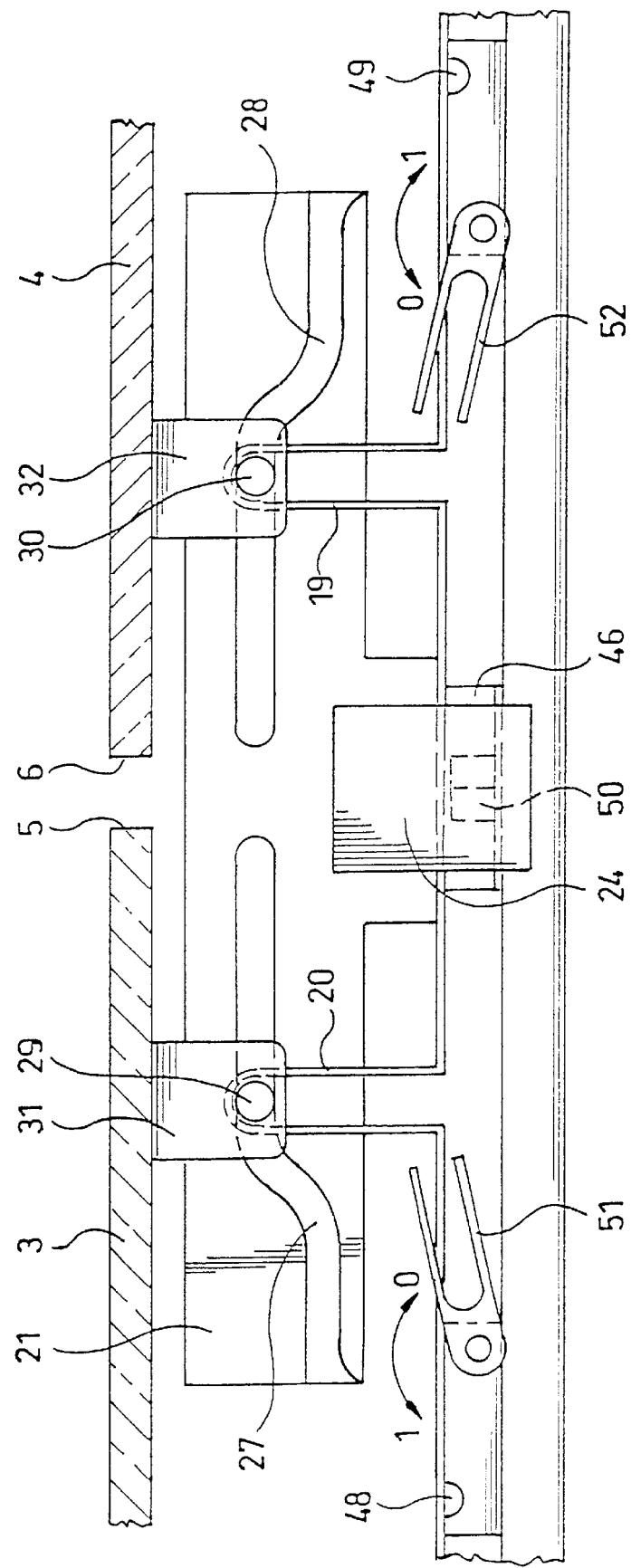

MOTOR VEHICLE ROOF WITH AT LEAST
TWO COVERS LOCATED IN A COMMON
ROOF OPENING

BACKGROUND OF THE INVENTION

1. Field of the Invention

The invention relates to a motor vehicle roof with at least one roof opening which is made in the fixed roof skin and in which there are at least two covers flush behind one another in a closed position which close the roof opening and which can be pushed into a position where they at least partially overlap one under the other, partially exposing the roof opening.

2. Description of the Related Art

In a known motor vehicle roof of this type with two covers (published International Patent Application WO96/26081A) it is provided that the two covers can be moved to open or close the roof opening, the cover which is in the rear in the direction of travel moving under the front cover when the latter is to be opened. Another example of this motor vehicle roof is known from published UK Patent Application GB-437 589 A. In this construction, the front cover is accommodated by the back cover or the back cover fits around the front cover in the manner of a pocket. As a result of this arrangement a smooth-surfaced appearance of the roof is impossible.

SUMMARY OF THE INVENTION

The primary object of the present invention is to devise a motor vehicle roof of the initially mentioned type with covers which enable a variable roof opening and which can be adjusted by a simply configured drive mechanism.

This object is achieved in a motor vehicle roof having at least one roof opening in a fixed roof skin and at least two covers located in the at least one roof opening flush one behind the other in a closed position closing the at least one roof opening, the at least two covers being displaceable into a first open position in which the covers at least partially overlap, one underneath the other, to partially expose the roof opening by the at least two covers comprising a pair of adjacent covers which are joined by a common mechanism by which each is selectively displaceable at least partially under the other which remains stationary.

In contrast to the initially described prior art, this invention takes a completely different approach, according to which, of the two adjacent covers, only one of the two covers is ever displaceable, the cover to be displaced being moved under the adjacent cover which remains stationary at the time, and preferably a common mechanism is used for enabling alternative displacement of the two adjacent covers.

According to one advantageous embodiment of the invention, the selectively stationary cover which has not been moved at the start of displacement of the other cover remains in the area of the abutting edges with its edge in the closed or raised position, whereupon the cover to be moved is lowered with its corresponding edge and is moved to under the stationary cover.

The motor vehicle roof made in accordance with the invention, therefore, allows a common drive mechanism for two adjacent covers. According to one advantageous embodiment it is provided that each cover, in the area of its transverse edge which is away from the other cover, in the closed position is guided to be able to pivot in two lateral guide rails in the area of the lengthwise sides of the roof opening, each cover in the area of its other transverse edge facing toward one another per guide rail is guided relative to the other in a sliding crank which is common to both covers and which forms part of the drive mechanism for vertical adjustment of this transverse edge area in opposite directions. Furthermore, there is a displacement means which, likewise, forms part of the drive mechanism for the lowered cover which disengages from the sliding crank in order to move the cover under the cover which is raised or which remains in the closed position. In other words, the drive mechanism optionally has a first part for raising the stationary cover in the area of its edge facing the other cover, and a second part for lowering the cover to be moved, which, as soon as it has been completely lowered, can be pushed into any position under the stationary cover by the displacement means.

Advantageously, the sliding guide has guide grooves which run ascending towards its lengthwise center and into which guide pins fit which are attached in the area of the vertically adjustable transverse edges of the cover to these edges. Preferably, the guide grooves run essentially in an S shape, the guide pins when in the closed position lying in the upper area of the guide grooves, or for an alternative embodiment, the covers coming to rest in the area of the ascending sections of the guide grooves.

To each guide groove of the sliding guide is assigned an ascending guide which is permanently connected to the guide rail with an essentially vertical ascending groove which is open towards the displacement means.

Furthermore, advantageously, the displacement means for each cover is provided with a slide which is permanently connected to a drive cable, with a driving recess for the respective guide pin. To make transfer of the guide pin out of the guide groove of the sliding guide or the ascending groove of the ascending guide into the driving recess of the slide reliable and free of problems, there is advantageously, moreover, a corresponding transfer means. According to a first embodiment, the transfer means comprises a fork which is pivotably coupled to the displacement means to pivot parallel to the guide pin and into which the guide pin fits before it leaves the guide groove of the sliding guide or the ascending groove of the ascending guide. The fork guides the guide pin in the transfer and then also secures it when it is held by the displacement means.

According to a second advantageous embodiment, the transfer means has a lift element which supports the guide pin leaving the guide groove of the sliding guide or the ascending groove of the ascending crank and is lowered to transfer the guide pin to the driving recess of the displacement means under this recess controlled by a lifting guide which is actuated by grooves in the sliding guide.

Moreover, there is advantageously a coupling means to couple the sliding guide in the active state in which it is in contact with the cover to be moved to the displacement means, and in its passive state in which it is separated from this cover, to the guide rail. Preferably, the coupling means is made as a locking block mechanism.

In the following the invention is explained by way of example using the drawings which show preferred embodiments of the invention.

BRIEF DESCRIPTION OF THE DRAWINGS

FIGS. 2 & 3 are exploded perspective views of a first embodiment of the common drive mechanism which is provided for the two covers of FIG. 1, FIG. 2 showing the guide rail and the ascending guide, while FIG. 3 shows the displacement means for the ascending guide and the two covers;

FIGS. 4 & 5 show exploded view of a second embodiment of the common drive mechanism which is provided for the two covers of FIG. 1, FIG. 4 showing the guide rail and the ascending guide and FIG. 5 showing the displacement means for the ascending guide and the two covers;

FIGS. 6 & 7 schematically show a locking block mechanism for fixing/releasing the ascending guide with reference to the displacement means, FIG. 6 schematically showing a perspective view of the locking block mechanism and FIG. 7 showing a cross section of this locking block mechanism;

FIG. 9 is a side view schematic illustrating the mechanism as shown in FIGS. 2 & 3.

DETAILED DESCRIPTION OF THE INVENTION

Figure 1:
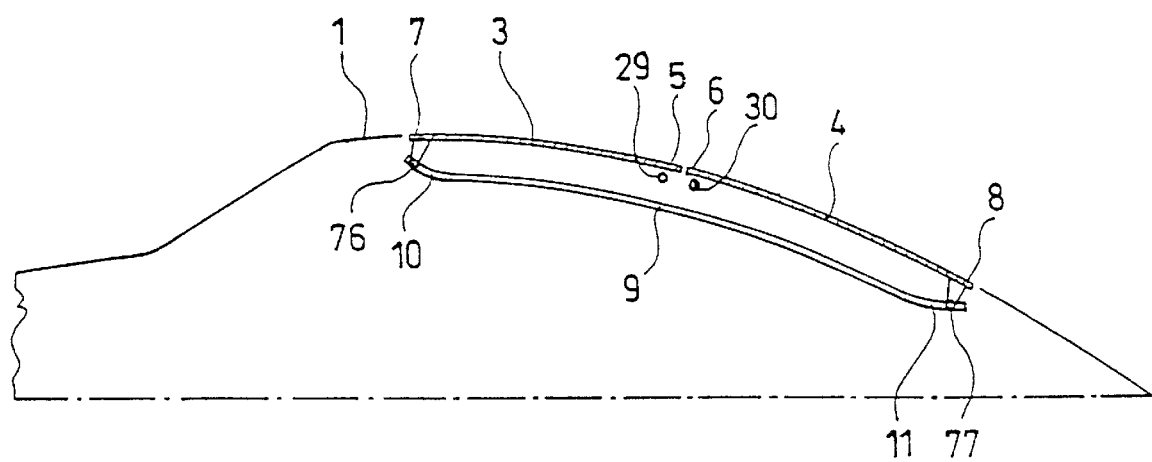
FIG. 1 is a schematic cross-sectional side view showing a top part of a motor vehicle body with two covers which are located in a common roof opening and with a guide rail for them.

As FIG. 1 shows, the skin 1 of a motor vehicle roof has a roof opening 2 into which two covers 3 and 4 are inserted, arranged flush behind one another in the closed position. With reference to the direction of forward vehicle travel, the cover 3 is located in front of the cover 4. In the closed position shown in FIG. 1, the rear edge 5 of the front cover 3 borders the front edge 6 of the rear cover 4, while the front edge 7 of the front cover 3 and the rear edge 8 of the rear cover 4 lie flush with the fixed roof skin, like the side edges of the front cover 3 and of the rear cover 4 which are not visible in FIG. 1. The two covers 3 and 4 are guided in guide rails 9 which run on either side of the roof opening 2 underneath it, of which FIG. 1 shows only one guide rail 9. The two covers 2 and 3 are guided in the respective guide rail 9 by means of a common drive mechanism which is explained below using FIGS. 2 to 5.

The guide rail 9 on the end which is the front end with reference to the forward direction of vehicle travel (toward the left in FIG. 1) has an end guide 10, and the rear end of the guide rail has an end guide 11. In the end guides 10, 11, which curve upward toward the front and rear, respectively, a front guide pin 76 of the front cover 3 and a rear guide pin 77 of the rear cover 4 are supported to be able to pivot and slide. Thus, the guide pin 76 enables a pivoting motion of the front cover 3 by which the front cover 3 is lowered in the area of the rear edge 5 and with subsequent displacement of the front cover 3 toward the rear, the end guide 10, which curves downward toward the rear, provides for the front edge 7 of the front cover 3 also to be lowered so that the front cover 3 can be pushed completely under the rear cover 4.

The guide pin 77 enables a pivoting movement of the rear cover 4 such that the rear cover 4 is lowered in the area of its front edge 6 as the rear cover 4 is moved forward due to the forward and downward curvature of the end guide 11 which then causes the edge 8 of the rear cover 4 to also be lowered so that the rear cover 4 can be pushed completely under the front cover 3.

Figure 2:
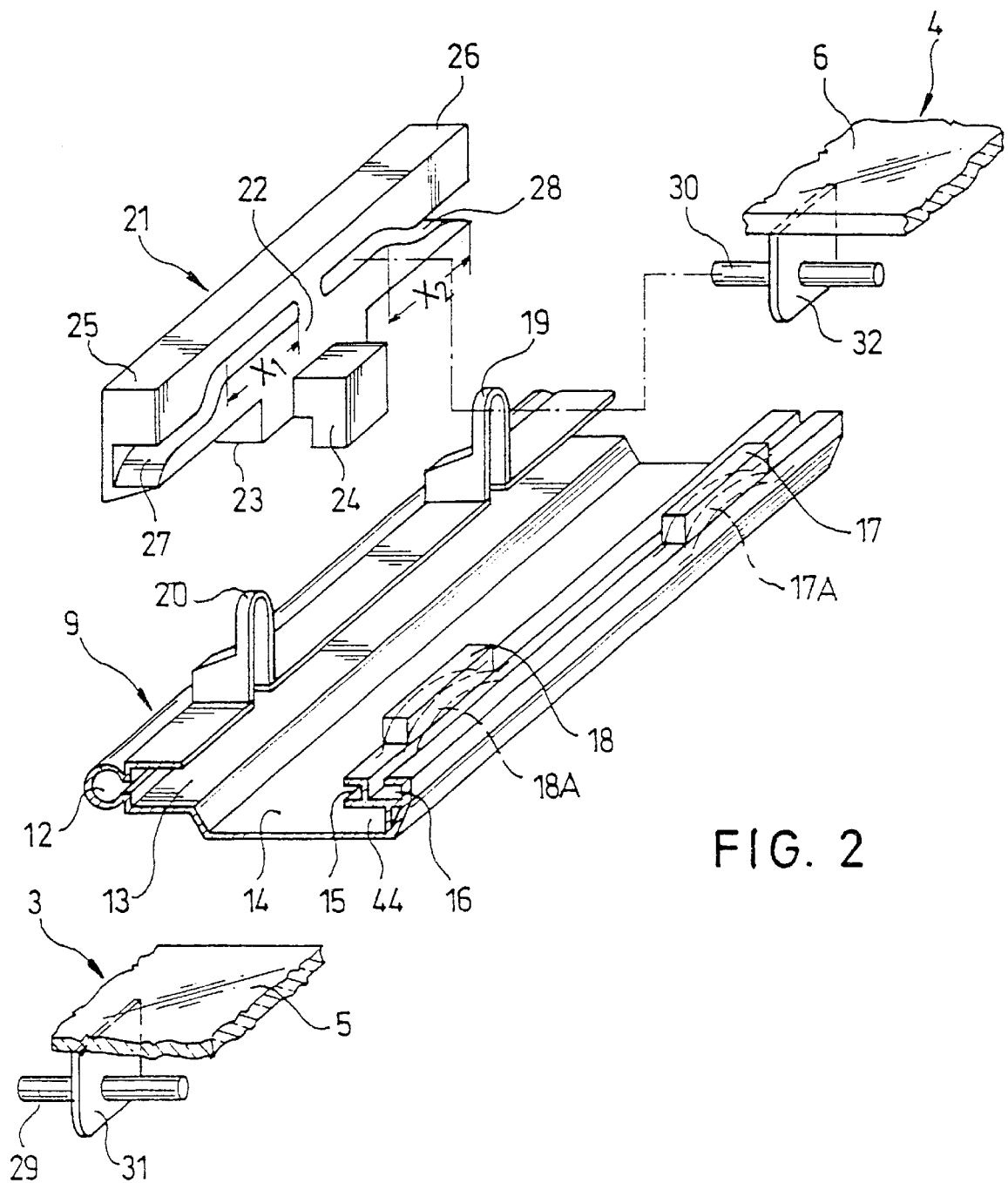
Figure 3:
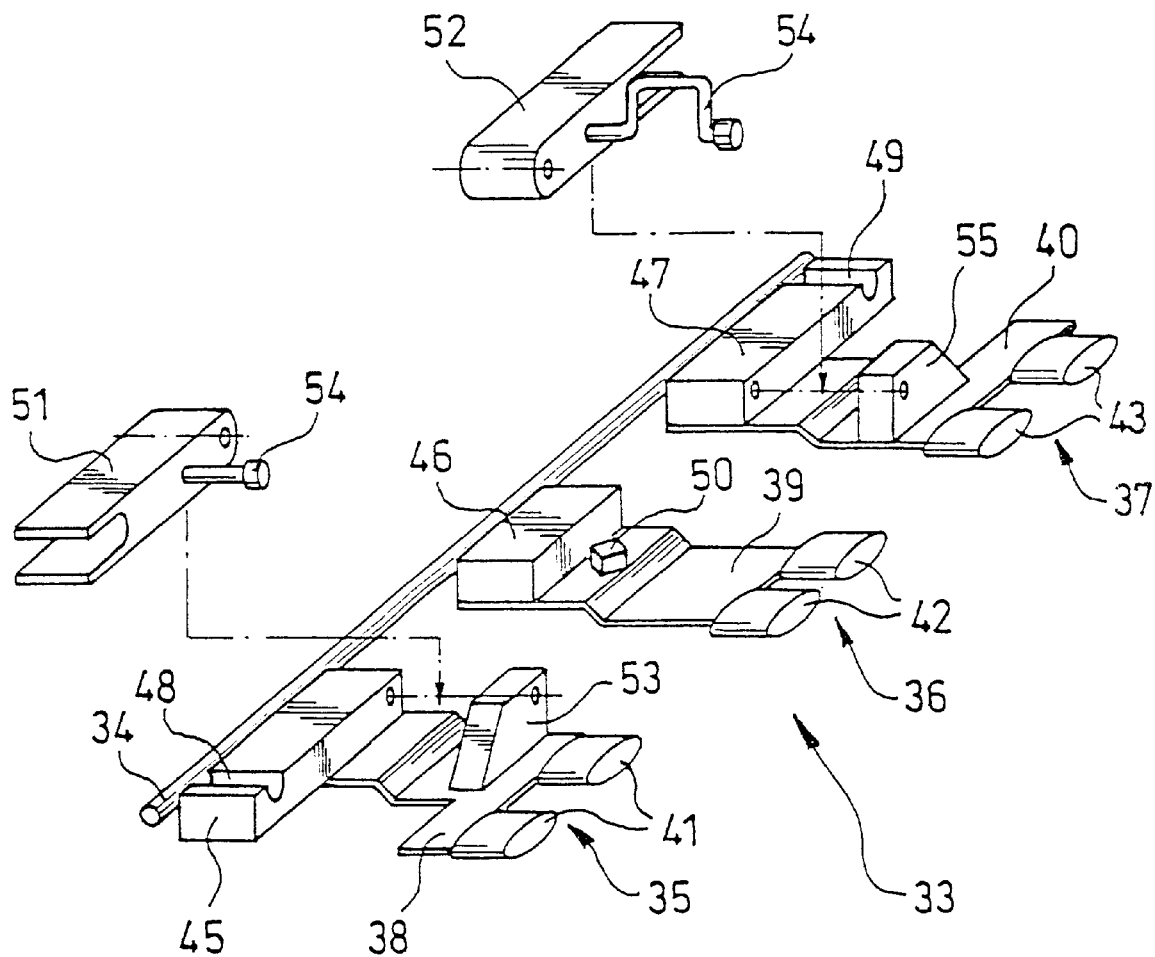

At this point, a first embodiment of the common drive mechanism provided in accordance with the invention for the covers 3 and 4 is explained using FIGS. 2 & 3.

As FIG. 2 shows, the guide rail 9 is made as an elongated profile part and contains the following guide sections: a cable guide channel 12 of circular cross section which is located to the outside with reference to the roof opening 2 and which has a slot-shaped opening at its inner side, and a slide guide channel 13 with a U-shaped cross section which inwardly adjoins the cable guide channel 12 and which is likewise open inwardly, and a lower guide rail bottom 14 which adjoins the slide guide channel 13. Relative to the open side edge of the slide guide channel 13, lying elevated over the guide bottom 14, are two channels with a U-shaped cross section which are open in the direction toward the slide guide channel 13 and which are offset laterally relative to one another. The one of these two channels which is nearer the slide guide channel 13 forms a first lifter guide channel 15 which is explained below, while the other channel forms a second lifter guide channel 16. Both lifter guide channels 15, 16 and the slide guide channel 13 which lies opposite them, lie above a slide block guide channel 44 which is used to guide the displacement means 33 shown in FIG. 3. The function of the guide channels 12, 13 and 15, 16 is explained below.

A first lifting guide 17 and a second lifting guide 18, which in the embodiment shown are made as elongated cuboids, are permanently mounted on the guide rail sections of U-shaped cross section which form the first and second lifter guide channels 15, 16, extending spaced apart from one another in the lengthwise direction of the guide rails 9. In the lifting guides 17 and 18, as shown by the broken lines in FIG. 2, guide paths 17A and 18A are formed which are arched upward and replace the lifter guide channels in these areas. In the same longitudinal position as the first lifting guide 17 and the second lifting guide 18 and facing them, there are a first ascending guide 19 and a second ascending guide 20 on the profile section which forms the slide guide channel 13. These ascending guides are formed as generally U-shaped guide parts which discharge into the guide channel 13 and which are open at the bottom and closed at the top.

A sliding guide 21 is also shown in FIG. 2. The sliding guide 21 forms a part which is rectanguloidal in its basic shape with a molded-on slide block 22 which is located in the lengthwise middle of the sliding guide 21 and on the bottom has a sliding surface 23 which is designed to slidably engage on the top of the profile part of the guide rail 9 which forms the slide guide channel 13, the slide path in the lengthwise direction of the guide rail being determined by the distance between the two ascending guides 19 and 20, and the shorter mutual distance between the faces of the sliding block 22. The sliding guide 21 is driven by a drive cable 34, (FIG. 3) which runs in the cable guide channel 12 as explained below, by means of a drive block 24 which is permanently connected to the slide block 22, projecting laterally inward and also extending downward, which can be caused to engage the slide which is attached to the drive cable 34 which is explained below.

Guide grooves 27 and 28 are formed in the ends 25 and 26 of the sliding guide 21 which adjoin the sliding block 22 on each side and facing the center of the guide rail, mirror-symmetrically relative to the middle of the sliding guide 21. Below, with reference to the direction of forward vehicle travel, the end 25 of the sliding guide is designated the front end of the sliding guide 21, the end 26 of the sliding guide is designated the back end of the sliding guide 21, the guide groove in the front end 25 of the sliding guide is designated the front guide groove 27 and the guide groove in the rear sliding guide 26 is designated the rear guide groove 28. The guide grooves 27 and 28 are open at the end faces of the ends 25 and 26 of the sliding guides 21 and run proceeding from these end faces in the direction toward the central sliding block 22 ascending in the form of a generally S-shaped guideway. This means that, proceeding from the indicated end faces, the guide grooves 27, 28, or the guideways established by them, first of all, have a section which is widened with insertion bevels as an insertion throat, followed by an essentially horizontally running lower section which is followed in turn by a section which rises like a ramp and which adjoins an essentially horizontally running top section towards the center of the sliding guide 21. The guide grooves 27 and 28 are used to guide the guide pins 29, 30 which are provided on the bottom of the front cover 3 and of the rear cover 4. In particular, the guide pin 29 extends transversely or perpendicularly to the lengthwise direction of the guide rail 9 on the bottom in the area of the rear edge 5 of the front cover 3 at a distance from its bottom where is attached by a holding clip 31. Similarly, the guide pin 30, in the area of the front edge 6 of the rear cover 4, is attached by means of a holding clip 32 which projects from the bottom of rear cover 4 and runs transversely to the longitudinal direction of the guide rail 9.

When the front cover 3 and the rear cover 4 are located jointly in the closed position which is shown schematically in FIG. 1 and which closes the roof opening 2, the guide pins 29 and 30 are in the ascending guides 19 and 20 and lie in the horizontally running top sections of the guide grooves 27 and 28, such that the guide pins 29 and 30 each can traverse an idle path during the lowering motion of the cover which is adjacent at the time. According to one alternative embodiment, the guide pins 29 and 30 lie roughly on half the extension length of the guide grooves 27 and 28 at the turning point of their S-shape or in their central, obliquely running section such that, when one of the covers 3 or 4 is lowered, the other cover 4 or 3 which is adjacent at the time executes a lifting motion at the same time. The horizontal upper sections of the guide grooves 27 and 28 have a length $X_1$ which is somewhat greater than the length $X_2$ of the obliquely running section and of the lower horizontal section.

Before the displacement adjustment of the covers 3 and 4 is explained, proceeding from the above cited closed cover position, the mechanism for moving the covers 3 and 4, i.e., the corresponding displacement means 33, is explained with reference to FIG. 3.

The displacement means 33 comprises the aforementioned drive cable 34 which is connected to a drive motor (not shown) and is guided in the cable guide channel 12 of the guide rail. At a given mutual distance, a center slide and a rear slide are connected to the drive cable 34 at a specific distance relative to the direction of travel from front to back. These slides are labeled as follows below: The front slide is designated the displacement slide 35 for the front cover 3, the rear slide is designated the displacement slide 37 for the rear cover 4 and the middle slide, which is located in between, is designated the displacement slide 36 for the sliding guide 21. Each of the displacement slides 35, 36, 37 comprises a base sheet metal part (or plastic part) 38, 39, 40, respectively, which is anchored on the drive cable 34 at one lateral end, and its other end bears a pair of slide blocks 41, 42, 43, respectively. The three successive pairs of slide blocks 41, 42 and 43 fit into a slide block guide channel 44 which is U-shaped in cross section and which is located on the inner side edge of the guide rail 9 underneath the two lifter guide channels 15, 16. Since the displacement slides 35, 36, 37 are at a fixed distance relative to one another, anyway, by means of the drive cable 34, alternatively they can also be joined by fixed connecting elements or can be made as a single component.

Following the drive cable 34, elongated cuboidal slide guide parts 45, 46 and 47 are permanently attached on the top of the base sheet metal parts (or plastic parts) 38, 39 and 40, respectively. These slide guide parts 45, 46, 47 are guided in the slide guide channel 13 of the guide rail 9. The slide guide part 45 of the displacement slide 35, in the area of its front end, has a driving recess 48 which is upwardly open to receive the guide pin 29. Similarly, the back end of the slide guide part 47 has a driving recess 49 which is upwardly open to receive the guide pin 30, as explained below, to cause the longitudinal displacement of the front cover 3 or the rear cover 4. In the direction toward the pair of slide blocks 42 of the middle displacement slide 36, next to the slide guide part 46 of this slide, there is a carrier block 50 which can be coupled to the drive block 24 of the sliding guide 21 by means of a locking block mechanism which is shown in FIGS. 6 & 7, as explained further below.

In addition, the front and the rear displacement slides 35, 37 are equipped with guide pin transfer mechanisms which, in the first embodiment as shown in FIGS. 2 & 3, are made as pivoting transfer forks 51, 52, respectively. The front transfer fork 51 is intended for the front guide pin 29 and the rear transfer fork 52 is intended for the guide pin 30. The transfer fork 51 is supported on the displacement slide 35 to be pivotably displaced at its back end which is opposite the front fork opening end. For this purpose, the pivot bearing end of the transfer fork 51 is penetrated by a shaft which, for its part, on both ends, on the one hand, fits into the end of the slide guide part 45, i.e., the end opposite the carrier recess 48, and on the other hand, into a pivot bearing part 53 which is permanently connected to the base sheet metal part (or plastic part) 38 of the displacement slide 35. Projecting laterally inward on the transfer fork 51, a pin-shaped actuating arm 54 is attached; its free end which is provided with a sliding head is guided in the first lifter guide channel 15.

There is a similar pivot adjustment mechanism for the rear transfer fork 52; i.e., an actuating arm 54 which fits with its sliding head end into the second lifter guide channel 16 of the guide rail 9, and a pivot bearing part 55 laterally spaced away from that end of the slide guide part 47 which is opposite the carrier recess 49. FIG. 3 shows the transfer forks 51, 52 in a pivot position which is opposite by 180° and which represents a pure installation position and not an operating position. For the covers 3 and 4, in the closed position, the transfer forks 51, 52, are position as is shown in FIG. 9, with their fork ends pointing towards one another. From this closed position (initial position), only one of the transfer forks 51, 52 at a time moves; in particular, the one of one of the covers 3 and 4 which is to be lowered at the time into a transfer position which points to the outside and in which the respective fork end secures the guide pin 29, 30 in the respective carrier recess 48, 49. The transfer fork of the cover which is not to be lowered, i.e., the fork which is the other one at the time, remains in its initial position.

In the following, the opening process for the rear cover 4 is explained as representative for the opening process of the two covers 3 and 4, the opening process for the front cover 3 proceeding similarly to that for the rear cover 4, but with the drive cable 34 being driven oppositely.

When the covers 3 and 4 are in the closed position, their guide pins 29, 30, respectively, are in the top area of the first ascending guide 19 and the second ascending guide 20 and they fit into the guide grooves 27 and 28 in their essentially horizontally running top sections. At this point, if the rear cover 4 is to be moved forward under the front cover 3, the drive cable 34 is driven in the direction of travel forward, or in the direction from the rear to the front cover, and the sliding guide 21 is coupled, by means of a locking block mechanism, which is shown in FIG. 6 & 7 and which encompasses a drive block 24 and a carrier block 50, to the displacement slide 36 which, therefore, entrains the sliding guide 21 in the drive direction of the drive cable 34. In this entrainment motion of the sliding guide 21, the guide pin 29 of the front cover 3 runs along its guide groove 27 in the sliding guide 21 through the horizontal part in the direction towards the center of the sliding block 22. As a result of the fact that the guideway 27 runs horizontally in this area, the pin 29 thus remains at the same height so that the front cover 3 remains in its closed position. In an alternative embodiment, the guide 27 of the corresponding shape makes it possible, in addition to a lowering motion of one cover 4, to raise the other cover 3 in order to thus obtain more space for the covers to move over one another.

Simultaneously with the motion of the sliding guide 21, the front edge 6 of the rear cover 4 is lowered, since as a result of the lengthwise displacement of the sliding guide 21 of the guide pin 30 on the rear cover 4, its guide groove 28 is moved down in the direction toward the open back end, and at the same time, in the vertical direction to the lower open end of the first ascending guide 19. During this lowering motion, the pin 30 is held by the transfer fork 52 before emerging from the ascending guide 19. The transfer fork 52 pivots the guide pin 30 around its pivot axis to the rear (from the position labeled "0" in FIG. 9 into the position labeled "1") so that the open, fork-shaped end of the fork 52 then points to the rear, the guide pin 30, however, still being located in the fork end. In the course of continued driving of the drive cable 34, the guide pin 30 of the rear cover 6 comes completely free from the guide groove 28 of the sliding guide 21, and guided by the ascending guide 19, and in addition by the fork-shaped end of the fork 52 which, at this point, borders the driving recess 49, slides into the recess 40. In this transfer motion of the transfer fork 52, decoupling of the sliding guide 21 from the drive cable 34 and the displacement slide 36 takes place by decoupling the drive block 24 of the sliding guide 21 from the carrier block 50 of the displacement slide 36, as is explained below using FIGS. 6 and 7.

At this point, a state is produced in which the front edge 6 of the rear cover 4 is lowered to the maximum degree and the guide pin 30 of this cover lies in the driving recess 49. At this point, further driving by the drive cable 34 causes displacement of the guide pin 30 to the identical height together with its displacement slide 37, by which the rear cover 6 is pushed under the front cover 5, optionally, until the rear cover 4 comes to rest completely under the front cover 5 and running parallel to it. The transfer fork 52 moves, at the same time, and additionally secures the guide pin 30 in the driving recess 49. The pivoting motions of the transfer fork 52 are controlled by the engagement of the actuating arm 54 in the second lifter guide channel 16 and by lifting when the guide path 17A is traversed. Conversely, if the front cover 3 is to be lowered for displacement to under the rear cover 4, in doing so the pivoting motion of the transfer fork 51 is controlled by the engagement of the actuating arm 54 in the first lifter guide channel 15 and by lifting when the guide path 18A is traversed. The actuating arm 54 of the rear transfer fork 52 has a right-angle bend which makes it possible for it to move over the ascending guide 18 without striking it.

Closing of the rear cover 4 is produced such that the drive cable 34 is moved in the opposite direction, therefore against the direction of travel of the motor vehicle. As soon as the front edge 6 of the rear cover 4 approaches the rear edge 5 of the front cover 3, the sliding guide 21 is coupled again to the drive cable 45 and is entrained via its drive block 24 and the carrier block 50. In doing so, the guide pin 30 of the rear cover 4 is entrained in the driving recess 49 of its displacement slide 37. Thereupon, the transfer fork 52, driven by the actuating arm 54 and the guide path 17A of the lifting guide 17, swings up and moves the guide pin 30 into the open end of the ascending guide 19 and into the open end of the guide groove 28, along which and along the ascending guide 19, the guide pin 30 is moved up until it finally comes to rest in the top, horizontally running section of the guide groove 28, which position corresponds to the completely closed position of the rear cover 4.

If the front cover 3 is to be opened, i.e. moved under the rear cover 4, the drive process explained above for the rear cover 4 runs in the opposite direction, proceeding from the covers 3 and 4 which are located in the closed position.

Figure 5:
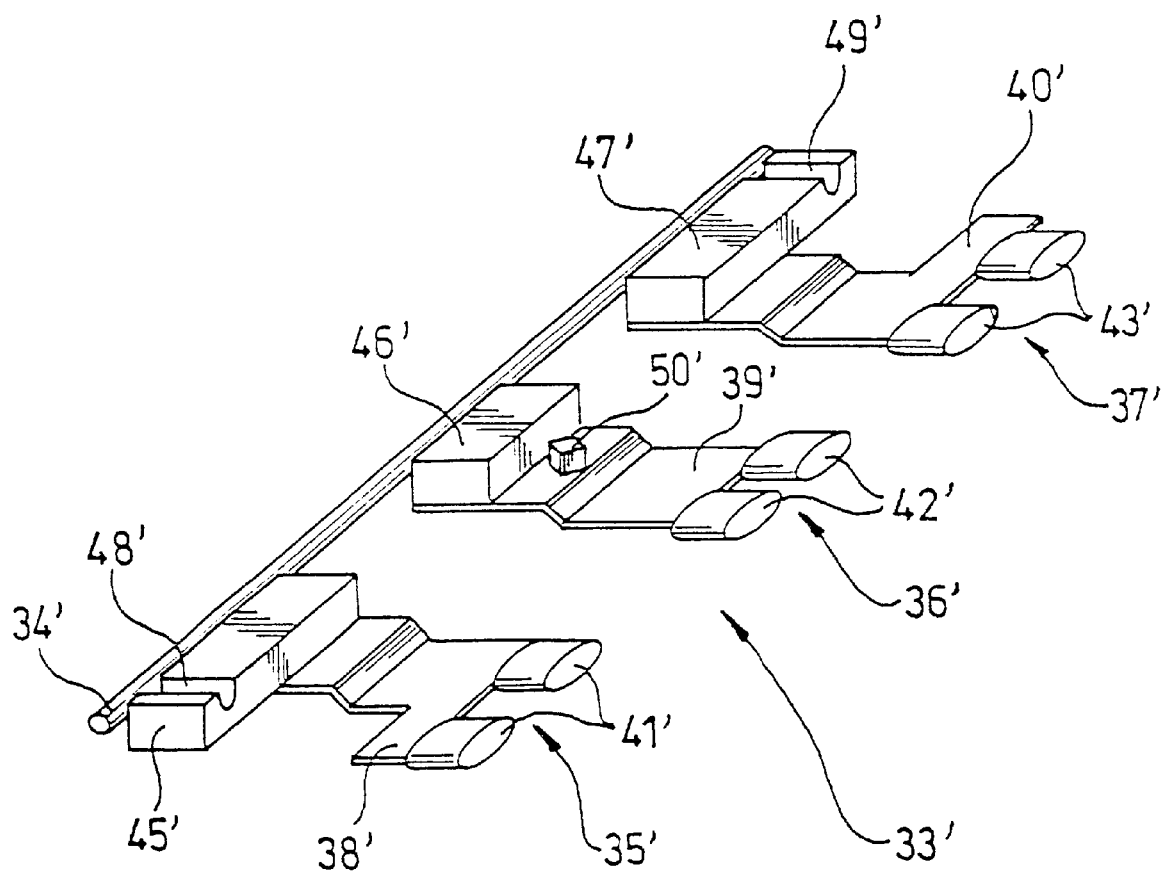

At this point, using FIGS. 4–6, a second embodiment of the drive mechanism for the two covers 3 and 4 which is made in accordance with the invention is explained.

As proceeds from FIG. 6, the displacement mechanism as shown in the second embodiment is simplified with reference to the displacement mechanism of the first embodiment which is shown in FIG. 3 to such an extent that it does have the same three displacement slides 35, 36 and 37 with the corresponding driving recesses 48 and 49 and carrier block 50, but not the transfer mechanism in the form of the transfer forks 51 and 52 and their parts which are necessary for coupling to the slides. Rather, this transfer mechanism is integrated, on the one hand, into the sliding guide 21' in the second embodiment, and on the other hand, is implemented on the guide rail 9 in addition to the ascending guides 19' and 20'. The parts in FIGS. 4 and 5 which are the same as those in FIGS. 2 and 3 are labeled with the same reference numbers, but also with a prime (').

As a result of the simple structure of the displacement means 33' as compared to the displacement means 33 according to the first embodiment, the inward side edge of the guide rail 9 is made correspondingly simpler without the lifter guide channels; i.e., the guide rail 9 has simply the slide block guide channel 44 on the inner side edge.

Only the parts of the second embodiment which are different according to FIGS. 2 & 3 from the first embodiment are explained below.

The sliding guide 21' has guide grooves for the guide pins 29' and 30' of the covers 3' and 4'. In contrast to the first embodiment, these guide grooves, which are labeled 27' and 28', are modified with respect to the way they run; i.e., the guide grooves 27' and 28' do not discharge into the end faces of the sliding guide 21', but in front of these end faces into the bottom of the sliding guide 21' and in addition run in a modified manner with a section which rises steeply proceeding from the end of the outlet, whereupon a flat section and a thereupon slightly rising section and towards the middle a horizontal end section adjoin. Otherwise, the guide grooves 27' and 28' interact with the ascending guides 19' and 20' in the same manner as in the first embodiment. The ascending guides are labeled 19' and 20' in the second embodiment which is shown in FIG. 4 and form blind slots which are open to the bottom and which are closed to the top within a rectanguloidal block 56 which is provided on the top of the profile part of the guide rail 9', the part which fixes the slide guide channel 13', the free lower ends of the ascending guides 19' and 20' being flush with the recesses in the guide rail 9'.

The transfer mechanism in the embodiment which is shown in FIG. 4 is an arrangement comprised of lifting guides with lifting grooves 58 and 59 which are located in the direction of travel in front of the ascending groove 20' or behind the ascending groove 19'. The obliquely running lifting grooves 58 and 57 are closed to the top and open to the bottom of the block 55. These open ends of the lifting grooves 57 and 58 are flush with openings in the guide rail 9', and in these lifting grooves 58 and 57 lifting blocks 59 and 60 run, from which a pin 61 and 62, respectively, laterally projects. The pins 61 and 62 are guided in a groove 63, 64, respectively, which are formed in the two end areas of the rectanguloidal sliding guide 21' between its faces and the guide grooves 27', 28' which lie inwardly in this respect. These grooves 63 and 64 have an S shape and extend rising from the end faces of the sliding guide 21'.

In the following, the opening phase of the rear cover 4' is explained as representative for both covers 3' and 4'; otherwise, the movement of the rear cover 4' under the front cover 3' proceeds similarly to what was explained above using the first embodiment as shown in FIGS. 2 and 3.

For the covers 3' and 4' which are in the closed position, their guide pins 29' and 30' are in the upper ends of the first ascending guide 19' and the second ascending guide 20' in the guide grooves 27' and 28' in their essentially horizontally running top sections. At this point, if the rear cover 4' is to be moved forward under the front cover 3', the drive cable 34' is driven in the direction of forward travel or in the direction from the rear cover 4' toward the front cover 3', and the sliding guide 21' is coupled, by means of a locking block mechanism which is shown in FIGS. 6 & 7 and which encompasses a drive block 24 and a carrier block 50, to the displacement slide 36' which, therefore, entrains the sliding guide 21' in the drive direction of the drive cable 34. In this entrainment motion of the sliding guide 21', the guide pin 29' of the front cover 3' runs along its guide groove 27' in the sliding guide 21' through the horizontal part in the direction towards the center of the sliding block 22'. At the start of the movement of the drive cable 34, with the covers 3' and 4' in the completely closed position, the guide pin 30' runs down in the guide groove 28' and in the ascending guide 19'. As soon as the guide pin 30' reaches the open end of the ascending guide 19', it engages a support part 65 which runs parallel to the guide rail 9' and which closes the recess in the guide rail 9' in this position. As the drive cable 34 continues its driving motion, the pin 61 of the lifting block 59 runs down the descending path of the S-shaped groove 63, causing the support part 65 to be lowered under the opening in the guide rail until directly over the driving recess 49' in the slide 47' so that it is ensured that, as the drive cable 34 continues to drive, the guide pin 30 is transferred cleanly into the driving recess 49'. Thereupon, the continuing motion of the rear cover 4 is occurs as explained above using the first embodiment according to FIGS. 2 & 3. In the opposite case, when the rear cover 4 is transferred into its closed position, the guide pin 30', when the support part 65 directly borders the driving recess 49, is transferred onto its top and together with the lifting block 59 is transferred into the opening end of the ascending guide 19' or the guide groove 28'.

As the closing guide 21' continues to move, the lifting of the front edge 6 of the rear cover 4', and optionally the lowering of the rear edge 5 of the front cover 3, is controlled by the lifting block 60, the grooves 63 and 64 and the guide grooves 27' and 28'.

Using FIGS. 6 and 7, at this point the coupling mechanism is explained for coupling and decoupling the sliding guide 21 to and from the drive cable 34.

FIG. 6 shows the sliding guide 21 purely schematically and reduced compared to its drive block 24. Moreover, the carrier block 50 which is rhomboidal in an overhead view and which is designed for coupling and decoupling with the drive block 24 is shown separately from the adjustment mechanism shown in FIGS. 3 & 5. This coupling process and the coupling relative to the guide rail are explained relative to FIG. 7 which shows, purely schematically, the guide rail 9 with the ascending guides 19 and 20 which are used at the same time as stops for the drive block 24. Accordingly, the drive block 24 has a tunnel-shape through channel 67 parallel to the lengthwise direction of the guide rail 9. Within the drive block 24 which is also made hollow transversely to the through channel 67 there are two locks 68 and 69 which are guided adjoining each other and the inner walls of the drive block 24 laterally and in their direction perpendicular to the guide rail 9 are pre-tensioned by springs 70 and 71. The two locks 68 and 69 are each penetrated by a through opening 72 and 73 running obliquely to one another in the transverse direction. This means that the through opening 72 in the drawings runs ascending from right to left, while the through opening 73 runs ascending from left to right. The through openings 72 and 73 are dimensioned such that the carrier block 50 for the sliding guide 21 can pass into or through it. They have working surfaces 78 and 79 which are opposite one another (on the through opening 72) and 80 and 81 (on the through opening 73) for interaction with the carrier block 50.

The mechanism which is shown in FIG. 7 works as follows: In the locked end position which is shown in FIG. 7, the sliding guide 21 adjoins the ascending guide 19 which forms one stop and the lock 69 is pressed by its spring 71 into a recess 74 in the guide rail 9. If at this point, as shown in FIG. 7, the carrier block 50 runs by virtue of the driving motion of the drive cable 34 into the through channel 67 of the drive block 24 (proceeding from the side which is to the right in the drawings) this block strikes the locking bolt 71, i.e., its working surface 80 which lies on the side of the spring 71, pushes it in the direction of the spring 71 to the side and thus decouples the drive block 24 from the guide rail 9. Thereupon, the carrier block 50 strikes the working surface 79 of the lock 68, i.e., the surface remote from the spring 70, which lock it cannot push aside as a result of its end face being in contact with the guide rail 9. In this position, the sliding guide 21 is connected solely to the carrier block 50 of the displacement slide 38, i.e., the block which forms the guide actuator, and is entrained there by this carrier block 50. In this position, it is moreover ensured that the carrier block 50 cannot be separated from the sliding guide 21 until the sliding guide 21 is locked again to the guide rail 9. This means that there is no undefined and thus unsure position of the sliding guide 21. At this point, the carrier block 50 and the drive block 24 coupled to it entrain the sliding guide 21 in the displacement direction X as far as into its other end position in which it strikes the ascending guide 20 which forms a stop. Since the carrier block 50 wants to continue to move, it presses the lock 68 by means of the working surface 79 into a recess 75 in the guide rail 9. The sliding guide 21 is then rejoined securely to the guide rail 9 and the carrier block 50 which forms the guide actuator is released again from the sliding guide 21 because, after the lock 68 is moved into the recess 75, it can emerge to the left from the through channel 67 in FIG. 7. After the sliding guide 21 is locked to the guide rail 9, the displacement means 33 released from the sliding guide 21 continues to move.

Figure 8A:
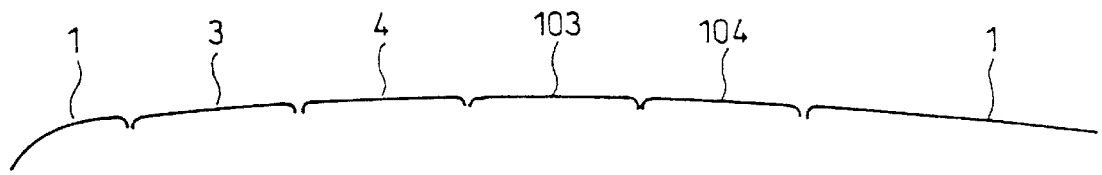
FIGS. 8a–8e are diagrammatic depictions of an embodiment with four covers in different positions, FIG. 8a showing a closed position and FIGS. 8b–8e showing four different roof openings that can be created by different cover movement combinations.
Figure 8B:
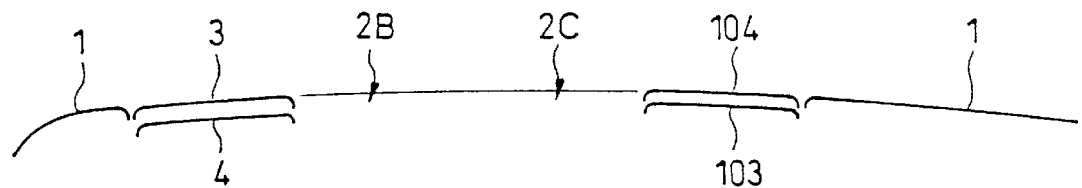

As shown in FIGS. 8a to 8e, instead of the two covers 3 and 4 which were explained in the previous embodiments, several pairs of cover parts can also be moved by an actuation mechanism which is made as in accordance with the invention. Thus, FIG. 8a shows a motor vehicle roof in which a total of 4 cover parts 3, 4, 103 and 104 are arranged in succession to close a large roof opening in a fixed motor vehicle roof 1 and to selectively open one or more of a series of partial open areas 2A to 2D.

Here, the two front covers 3 and 4 are coupled to one another by one of the drive mechanisms explained in FIGS. 2, 3, and 9 and FIGS. 4 and 5. Likewise, the two rear covers 103 and 104 are coupled to one another by such a drive mechanism. Actuation of the drive mechanism for the front covers 3 and 4 takes place by a first drive which can be located, for example, in the front area of the fixed roof 1. The two rear covers 103 and 104 are actuated by a second drive via a second set of drive cables, and this drive can be located, for example, in the rear area of the fixed roof 1.

As follows from FIGS. 8b to 8e, this arrangement yields a host of possible opening versions of the motor vehicle roof. Thus, in FIG. 8b, the cover 4 is moved under the cover 3 which lies in front of it, and at the same time, the cover 103 is moved under the cover 104 which is located behind it. The covers 4 and 103 expose areas 2B and 2C roof opening of the roof opening, which, as shown in the embodiment, preferably merge into one another, but also can optionally be separated from one another by a transversely running fixed element which is located between the areas and which is not shown.

Figure 8C:
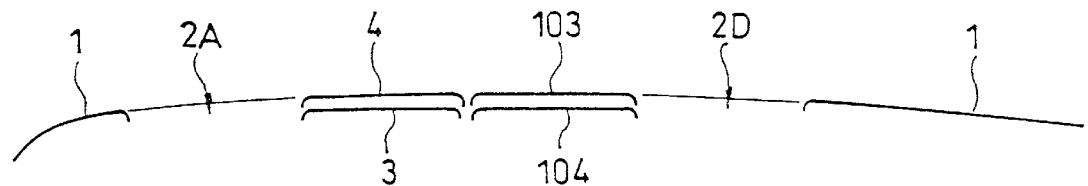

In FIG. 8c, the cover 3 is moved under the cover 4 which lies behind it, while the cover 104 is moved under the cover 103 which lies in front of it. In this opening version, the cover 3 exposes the front roof opening area 2A and the rear cover 104 exposes a roof opening area 2D which lies to the rear.

Figure 8D:
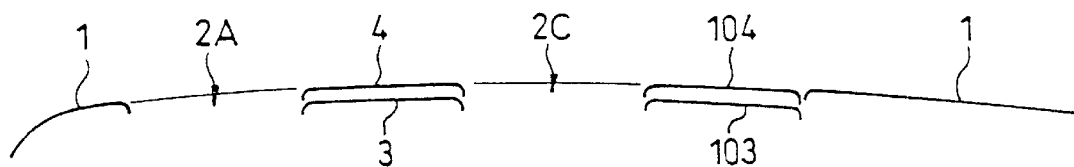

In the opening version as shown in FIG. 8d, the front cover 3 is moved under the cover 4 which lies behind it and the cover 103 is moved under the cover 104 which lies to its rear. In doing so, the cover 3 exposes front roof opening area 2A and the cover 103 exposes roof opening area 2C.

Figure 8E:
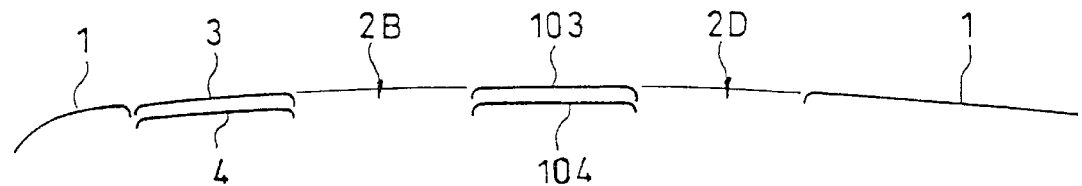

Finally, in FIG. 8e, the cover 4 is moved forward to under the cover 3 and the cover 104 is moved forward under the cover 103. In doing so, the cover 4 exposes the roof opening area 2B and the cover 104 exposes the roof opening area 2D in the rear part of the motor vehicle roof.

Optimum ventilation of the motor vehicle interior can be adjusted by the diversity of opening versions for each motor vehicle roof even with several rows of seats.

What is claimed is:

1. Motor vehicle roof comprising at least one roof opening in a fixed roof skin and at least two covers located flush in the at least one roof opening one behind the other in a closed position closing the at least one roof opening, said at least two covers being displaceable into a first open position in which the covers at least partially overlap, one underneath the other partially exposing the roof opening; wherein said at least two covers comprise a pair of adjacent covers which are joined to a single coupling mechanism by which each of the covers is selectively displaceable at least partially under the other which remains stationary.

2. Motor vehicle roof comprising at least one roof opening in a fixed roof skin and at least two covers located flush in the at least one roof opening one behind the other in a closed position closing the at least one roof opening, said at least two covers being displaceable into a first open position in which the covers at least partially overlap, one underneath the other partially exposing the roof opening; wherein said at least two covers comprise a pair of adjacent covers which are joined by a common coupling mechanism and each of which is selectively displaceable at least partially under the other which remains stationary; and wherein a single drive mechanism is provided to displace the two adjacent covers one at a time.

3. Motor vehicle roof as claimed in claim 2, wherein each of the two adjacent covers, in an area of a transverse edge which faces away from the other of the two adjacent covers, in the closed position, is guided to be able to pivot in two lateral guide rails which are positioned in an area of lengthwise sides of the roof opening; wherein each cover, in an area of transverse edge which faces the other of the two adjacent covers, is guided relative to one another at each of the guide rails in a sliding guide which is common to both covers and which forms part of a drive mechanism for vertical displacement of the facing transverse edge areas; and wherein a displacement means is provided which forms part of the drive mechanism for a lowered cover which is disengaged from the sliding guide in order to move the cover under the stationary cover.

4. Motor vehicle roof as claimed in claim 3, wherein the sliding guide has two guide grooves which run ascending towards each other and a lengthwise center of the sliding guide and into which guide pins fit which are securely attached to in the area of the transverse edges of the covers.

5. Motor vehicle roof as claimed in claim 4, wherein the guide grooves have one of an S-shape and a ramp shape, the guide pins, when the covers are in the closed position, resting in an upper horizontal section of the guide grooves.

6. Motor vehicle roof as claimed in claim 4, wherein the guide grooves are S-shaped, the guide pins, when the covers in the closed position, resting in an area of a turning point or ramp-shaped rise of the S-haped guide grooves so that the transverse edge of the stationary cover facing the other of the adjacent covers has a raised position at the start of displacement motion.

7. Motor vehicle roof as claimed in claim 4, wherein each guide groove has an associated ascending guide which is connected securely to the guide rail and which is open towards the displacement means.

8. Motor vehicle roof as claimed in claim 4, wherein the displacement means has a slide for each cover which is permanently connected to a drive cable and a driving recess for the respective one of the guide pins.

9. Motor vehicle roof as claimed in claim 7, wherein a transfer means is provided for transferring of the guide pin from the ascending groove of the ascending guide onto the displacement means and which ensures a defined position of the guide pins at each point of movement.

10. Motor vehicle roof as claimed in claim 9, wherein the transfer means comprises a transfer fork which is pivotally coupled to the displacement means to swing parallel to the guide pin and in which the guide pin is held before it leaves the guide groove of the ascending groove of the ascending guide and which kinematically guarantees the transfer of the guide pin to the displacement means.

11. Motor vehicle roof as claimed in claim 9, wherein the transfer means has a lift element which supports the guide pin when it leaves the ascending groove of the ascending guide and is lowered to transfer the guide pin onto the driving recess of the displacement means over and in front of the driving recess, the transfer means being controlled by a lifting guide which is actuated by a groove in the sliding guide.

12. Motor vehicle roof as claimed in claim 3, wherein a coupling means is provided for coupling the sliding guide to the displacement means in an active state in which it is in contact with the cover, and to the guide rail in a passive state in which it is separated from the cover.

13. Motor vehicle roof as claimed in claim 12, wherein the coupling means has a locking block mechanism which comprises spring-loaded locks with inclined working surfaces.

14. Motor vehicle roof as claimed in claim 4, wherein a transfer means is provided for transferring of the guide pin from the sliding guide onto the displacement means and which ensures a defined position of the guide pins at each point of movement.

15. Motor vehicle roof as claimed in claim 9, wherein the transfer means comprises a transfer fork which is pivotally coupled to the displacement means to swing parallel to the guide pin and in which the guide pin is held before it leaves the guide groove of the sliding guide and which kinematically guarantees the transfer of the guide pin to the displacement means.

16. Motor vehicle roof as claimed in claim 9, wherein the transfer means has a lift element which supports the guide pin when it leaves the guide groove of the sliding guide and is lowered to transfer the guide pin onto the driving recess of the displacement means over and in front of the driving recess, the transfer means being controlled by a lifting guide which is actuated by a groove in the sliding guide.

* * * * *